US011828268B2

(12) United States Patent
Daboul et al.

(10) Patent No.: US 11,828,268 B2
(45) Date of Patent: Nov. 28, 2023

(54) METHOD FOR DETERMINING THE ENERGY PRODUCTION OF A WIND POWER INSTALLATION

(71) Applicant: Wobben Properties GmbH, Aurich (DE)

(72) Inventors: Hussam Daboul, Südbrookmerland (DE); Kai Enskonatus, Hinte (DE); Muhanad Mahmoud, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/127,702

(22) Filed: Dec. 18, 2020

(65) Prior Publication Data

US 2021/0190035 A1    Jun. 24, 2021

(30) Foreign Application Priority Data

Dec. 20, 2019 (DE) .................. 102019135588.5

(51) Int. Cl.
*F03D 7/00* (2006.01)
*F03D 7/02* (2006.01)
*H02P 101/15* (2016.01)

(52) U.S. Cl.
CPC .......... *F03D 7/028* (2013.01); *F05B 2270/32* (2013.01); *H02P 2101/15* (2015.01)

(58) Field of Classification Search
CPC ...... F03D 7/028; H02P 9/006; H02P 2101/15; F05B 2260/821; F05B 2270/3032; F05B 2260/82; F05B 2260/8211; F05B 2270/335; F05B 2270/303; H02J 3/004; H02J 3/003; H02J 2203/10; H02J 2300/28

See application file for complete search history.

(56) References Cited

U.S. PATENT DOCUMENTS

| 8,577,509 B2 * | 11/2013 | Ong ..................... G05B 13/024 700/287 |
| 2015/0322926 A1 * | 11/2015 | Caponetti ............... F03D 7/028 416/1 |
| 2021/0242686 A1 * | 8/2021 | Petersen ................. H02J 3/381 |

FOREIGN PATENT DOCUMENTS

| CN | 102545268 A | * | 7/2012 |
| DE | 102013210090 A1 | | 12/2014 |
| EP | 2267305 A2 | | 12/2010 |
| WO | 2019/120404 A1 | | 6/2019 |

\* cited by examiner

*Primary Examiner* — Julio C. Gonzalez
(74) *Attorney, Agent, or Firm* — SEED INTELLECTUAL PROPERTY LAW GROUP LLP

(57) ABSTRACT

The invention relates to a method for determining the energy production to be expected for a wind power installation for a forecast time period, which may be an expected annual energy production. The installation has installation components. In the method, at least one of the installation components is selected as a thermally relevant component and chronologically distributed wind speed values are specified for the forecast time period. An expected power output level of the installation is determined for one of the wind speed values. In the power output level determining step, a component temperature which is assigned to this wind speed value is taken into account by the at least one thermally relevant component. The expected power output level of the installation, which is determined for the wind speed value, is used to determine the energy production of the installation which is to be expected for the forecast time period.

16 Claims, 7 Drawing Sheets

METHOD FOR DETERMINING THE ENERGY PRODUCTION OF A WIND POWER INSTALLATION

BACKGROUND

Technical Field

The invention relates to a method for determining the energy production, which is to be expected for a wind power installation for a forecast time period, in particular the expected annual energy production of a wind power installation.

Description of the Related Art

The expected annual energy production which is calculated in advance for a particular location of a wind power installation is often used to determine whether it is economically viable to install a wind power installation at this location.

The expected annual energy production of the wind power installation is typically obtained on the basis of a wind speed profile which is measured at this location over a year. However, it may be the case that the total, theoretically available wind power output level is not actually always converted by the wind power installation into electrical power. In particular, it is found that downward control of a wind power installation has to be carried out at an excessively high temperature. This can bring about deviations between the actual annual energy production and the forecast annual energy production which does not take into account such instances of downward control.

Therefore, there can be provision that an outside temperature profile is measured at the location over a year and that on the basis thereof it is decided using a derating curve, whether it is to be expected that the installation power output level of the wind power installation is at least temporarily reduced during this time. The wind power installation would then not be operated with the power output level which is available at that moment. It has become apparent that undesirably large deviations between the forecast quantity of energy and the actually generated quantity of energy can nevertheless occur.

BRIEF SUMMARY

As described here, the expected energy production of a wind power installation can be determined in an improved way for a forecast time period.

A method for determining the energy production which is to be expected for a wind power installation for a forecast time period, in particular the expected annual energy production of a wind power installation, is proposed.

A wind power installation comprises a plurality of installation components, such as, e.g., generally a spinner, a generator with a stator and a rotor, a machine housing, a tower and an electronics module in the tower, in particular a convertor or inverter in order to feed the generated power output level into the electrical power supply grid.

At least one of the installation components is selected as a thermally relevant component. Such a component which is selected as thermally relevant can be a stator and/or an electrodynamic rotor of a generator, or the generator as a whole. Such a generator can be impeded in its mode of operation by a high operating temperature because it has to be operated in a reduced fashion to protect against overheating and as a result produces a smaller power output level than it actually could on the basis of the wind. The same applies to a convertor or inverter which likewise must not be operated at any arbitrarily high temperature and can be selected as a thermally relevant component.

Therefore, a plurality of chronologically distributed wind speed values are specified for the forecast time period. Each of the specified wind speed values can be assigned, e.g., on the basis of a time stamp, to a different time within the forecast time period or they are simply present in a long sequence. The specified wind speed values can form a subset of the wind speed values of a chronological wind speed profile. The wind speed values can therefore be present as a wind speed profile.

Such a wind speed profile can comprise a number of previously measured wind speed values which are interpolated in order thereby to form the wind speed profile. A wind speed value of the specified wind speed values can be an actually measured wind speed value or an interpolated wind speed value of such a wind speed profile. A wind speed profile can also be a wind speed profile which is simulated for a location and which has been calculated, for example, by means of a climate simulation.

The plurality of specified, chronologically distributed wind speed values can be distributed in a chronologically regular or irregular fashion with respect to one another. The wind speed values are, however, preferably distributed in a chronologically uniform fashion within the forecast time period and are at a time interval from one another which is preferably between five minutes and one hour, in particular ten minutes. For the time period which lies between two chronologically adjacent wind speed values it is also possible to calculate an expected energy production level and to use it to calculate the expected energy production for the forecast time period. In order to calculate an expected energy production level for the time period which lies between two chronologically adjacent wind speed values, the expected power output level which is obtained for the chronologically earlier wind speed value can be multiplied by this time period, e.g., ten minutes. It is possible, for example, firstly to calculate the expected energy production levels which are respectively assigned to a time period between two wind speed values initially from a plurality of determined expected power output levels, and an expected energy production level for the forecast time period is calculated from said energy production levels, for example, by summing.

The at least one or more selected thermally relevant components can be assigned to a group of thermally relevant components on the basis of a specified criterion. The other installation components can be assigned to a further group of thermally irrelevant components, in particular on the basis of the same specified criterion.

It is possible to specify a plurality of chronologically distributed wind speed values for the forecast time period. For example, the forecast time period can be a year, and for this purpose wind speed values can be present in time intervals of ten minutes for the entire year. The forecast time period can comprise, as well as a year, a relatively short time period, e.g., several months. However, the forecast time period is preferably selected in such a way that it comprises a year. The method can be used to determine the expected annual energy production (AEP) of the wind power installation for this year.

The wind speed values respectively represent a wind speed. For this purpose, a value of a wind speed can be specified for each time interval. However, it is also possible to specify a profile of the wind speed, which, e.g., also takes into account a change in the wind speed within the time interval. However, at sufficiently low time intervals it may be sufficient to take into account one respective absolute value per time interval.

An expected power output level of the wind power installation is determined for one of the wind speed values in a power output level determining step. The expected power output level denotes that power output level which a wind power installation can generate or output under the given conditions, insofar as they are taken into account. This is particularly that power output level which the wind power installation could generate on the basis of the assumed wind speed. The assumed wind speed is specified by the respective wind speed value. However, further variables, such as the gustiness, could also be taken into account.

The expected power output level which is determined for this wind speed value can preferably be assigned, by means of a time stamp of the wind speed value, to a point in time within the forecast time period and it stipulates an installation power output level which is to be expected as the power output level generated by the wind power installation for this wind speed value.

Furthermore, a component temperature which is assigned to this wind speed value is taken into account in the determination of the expected power output level by the at least one thermally relevant component in the power output level determining step. Therefore, at least one specific component temperature is taken into account for the determination of the expected power output level. In particular there is provision to determine the corresponding component temperature specifically. Said temperature is then taken into account together with the wind speed in order to determine the expected power output level.

Therefore, for the same point in time or time segment of the forecast time period a wind speed value and a component temperature are present which are together taken into account in the determination of the expected power output level. The component temperature is obtained individually and the assignment of the individually obtained component temperature to one of the specified wind speed values can be carried out using a respective time stamp.

By means of the specific component temperature it is in particular possible to take into account thermally necessary downward control of the installation without, however, excessively early downward control being accepted. For example, the generator may become too hot and would then have to be operated in a throttled fashion in order to counteract a further rise in the generator temperature. In this context, it is possible to achieve an improvement over known methods which generally only take into account the outside temperature and decide about downward control in dependence thereon.

The proposed method is therefore aimed in particular at estimating the annual energy production of a wind power installation which is to be installed. For this purpose, the installation location is firstly surveyed, and it is determined what the expected wind speeds are, distributed over the year. These speeds are compiled as wind speed values in a wind speed profile for a simulation of the wind power installation which is to be installed. It is equally possible to compile a profile of the outside temperature, that is to say of the ambient temperature, as a temperature profile. The wind power installation which is to be installed is preferably simulated with these two profiles.

In this context it is taken into account that thermally relevant components can become too hot. This depends on the generated installation power output level and therefore on the respective wind speed, that is to say generally also on the outside temperature. Correspondingly, in the simulation it is taken into account that situations can occur in which downward control of the installation has to be carried out. However, it has been recognized that taking into account these two values alone in a generalized fashion, so the respective current installation power output level and the respective current wind speed, can be inaccurate.

In reality, if the installation which is planned in this way is then also installed and operated, downward control of the installation is of course also carried out in dependence on specifically measured temperatures, that is at the respective installation components, which possibly have to be protected against overheating. It is then detected that it can be advantageous to take into account such temperatures specifically in the simulation.

In this sense it is, however, also possible to make estimations of previously installed wind power installations, in order for example to estimate the potential of an improvement. It is also possible to take into account other relatively short or relatively long time periods.

In known methods, an expected power output level is frequently calculated from the wind speed and it is decided on the basis of what is referred to as a derating curve whether or not downward control of the wind power installation would be carried out. The derating curve of a wind power installation describes the maximum permissible installation power output level in dependence on a determined outside temperature. The derating curve is basically based on empirical values.

It has been recognized that the assumption of downward control of a wind power installation on the basis of a derating curve is often too cautious, so that downward control of the wind power installation is assumed even though in reality it would actually not take place. It has been found that in particular at relatively high outside temperatures the assumption of downward control on the basis of a derating curve of the wind power installation is comparatively inaccurate.

The imprecision comes from the fact that generally it is assumed on the basis of a derating curve of a wind power installation that an installation component becomes too hot even though this is not the case.

Overestimation of the component temperature of an installation component generally leads to a situation in which the downward control of the wind power installation owing to a supposedly excessively high component temperature of an installation component is assumed to occur more often than is actually the case. Correspondingly, an energy production level of a wind power installation which is to be expected for a forecast time period is then an energy production level which is actually possible for this forecast time period. Owing to the component temperature of an installation component, for which an excessively high estimation is generally made by means of a derating curve of a wind power installation, and therefore owing to the thermally conditioned power losses of the wind power installation which are then set at too high a level, an expected energy production level of the wind power installation is often underestimated and therefore an excessively conservative assumption about it is made. This can lead to a situation in which a location for a wind farm is evaluated as uneconomic even though the location is actually economically suitable. It can also lead to a situation in which cooling agent or cooling measures are proposed which, however, are then actually in fact not necessary or not to that degree.

Therefore, with the proposed method an improved and, in particular, more realistic determination of an expected power output level of a wind power installation is achieved. The component temperature of the thermally relevant component is preferably modeled on the basis of a model of the thermally relevant component. In particular, a model is suitable which is designed to model a transient thermal behavior of a thermally relevant component. A thermally transient model for modeling the component temperature of a thermally relevant component can take into account, for example, the geometry and/or the thermal capacity of the component.

A further advantage is that the installation components can be considered in more detail. For example, instead of considering the generator globally as a whole, the rotor and the stator of the generator can each be treated as separate components. An individual component temperature can be modeled both for the stator and for the rotor and assigned to a wind speed value.

The proposed method permits better modeling to be carried out on the basis of an, in particular individually modeled, component temperature of a thermally relevant component when downward control of a wind power installation would be carried out. Overestimating the component temperature on the basis of the inaccurate estimate essentially on the basis of an outside temperature of the wind power installation can therefore be avoided.

Particularly at locations with a high average outside temperature, the expected power output level of a wind power installation can be forecast significantly more accurately with the proposed method than is possible on the basis of derating curves. A thermally over-dimensioned installation configuration can therefore be avoided, in particular at locations with a high average outside temperature. Moreover, cooling concepts for a wind power installation based on individually obtained component temperatures of thermally relevant components can be configured more suitably and, in particular, in a more energy-optimized fashion.

In order to determine the expected power output level for a wind speed value it is possible to use a model of the wind power installation, and preferably a power output curve of the wind power installation, e.g., a rotational speed/power output curve.

According to one embodiment, a plurality of chronologically distributed outside temperature values which are respectively assigned to one of the plurality of wind speed values can be specified over the forecast time period. The outside temperature values which are assigned to the specified wind speed values can form a subset of outside temperature values of an outside temperature profile. A wind speed profile and an outside temperature profile are particularly specified within the same time period. By means of a time stamp it is then possible to assign an outside temperature value of the outside temperature profile to one of the specified wind speed values of the wind speed profile. Both profiles can also be easily specified as two equally long lists or sequences so that the assignment results from the position in the list or sequence.

In addition it is proposed that in the power output level determining step the expected power output level for the at least one wind speed value is determined using the outside temperature value which is assigned to this wind speed value and the component temperature, assigned to this wind speed value, of the at least one thermally relevant component.

For the determination of the expected power output level of the wind power installation for one of the specified wind speed values it is therefore possible to take into account, in addition to the component temperature of the at least one thermally relevant component, also the outside temperature value which is assigned to the wind speed value. In particular, an outside temperature can be taken into account in order to obtain the component temperature of the at least one thermally relevant component with increased precision. In this context, the outside temperature can be taken into account by means of a dynamic model.

The method preferably comprises a plurality of power output level determining steps in each of which an expected power output level which is assigned to the respective wind speed value is respectively determined for a different wind speed value of the specified wind speed values.

In preferred embodiment variants, for the determination of the expected energy production level over the forecast time period the power output level determining step is repeated successively for all the specified wind speed values. This results in a power output curve for the expected power output level which can then be integrated to form the total amount of energy generated here over time. In particular it is proposed to repeat the power output level determining step until all the expected power output levels which are integrated to form the energy production level which is to be expected overall for the forecast time period have been determined for the entire forecast time period.

By repeating the power output level determining step, a component temperature is respectively also newly obtained for the at least one thermally relevant component and is taken into account in the determination of the respective expected power output level. The component temperature of the respective current power output level determining step can preferably be determined in dependence on an earlier component temperature of the same component, in particular in dependence on the directly preceding value of the component temperature.

In particular, in each of the power output level determining steps, a component temperature of preferably at least one thermally relevant component is respectively obtained, in particular modeled individually, and used in a power output level determining step for a chronologically subsequent wind speed value for determining the expected power output level.

The component temperatures which are assigned to the respective different wind speed values, of the thermally relevant components, can each have different values. For example, during the time period which lies between two chronologically successive wind speed values the power output level of the wind power installation may have been increased so that the component temperature of a thermally relevant component increases owing to, e.g., mechanical loading or increased flow of current. Likewise, the component temperature which is assigned to a current wind speed value, of the thermally relevant component, may have dropped in comparison with an earlier point in time, since the component has output heat because, e.g., the power output level of the wind power installation was previously reduced or the outside temperature has dropped.

If an expected power output level has been determined in the proposed method in a plurality of repeatedly executed power output level determining steps for a respective different wind speed value of the specified wind speed values, the expected energy production level of the wind power installation for the forecast time period can be determined from all of the expected power output levels which have been obtained in this way. For example, the determined expected power output levels can be summed or integrated in order to determine the expected energy production level of the wind power installation for the forecast time period. The determined expected power output levels can also be initially interpolated, in order to form an expected power output level profile for the forecast time period, of which integration is carried out in order to determine the expected energy production level.

If the forecast time period comprises a shorter time period than a year, the expected energy production level which is determined for this forecast time period can be used to determine an expected annual energy production level, for example by projecting the expected energy production level onto a year. The proposed method can also be used to determine a respective expected energy production level for a plurality of forecast time periods which are distributed chronologically over a year. This plurality of expected energy production levels which are determined for different forecast time periods distributed over a year can be summed or integrated in order to determine an expected annual energy production level.

The method can also comprise the fact that an ideal power output level for which the wind power installation could generate under ideal boundary conditions and/or without taking into account thermal losses is determined in at least one power output level determining step for one of the wind speed values. The expected power output level can be obtained from the ideal power output level by means of an adaptation rule which is assigned to this wind speed value.

The ideal power output level which is determined for the wind speed value can be determined, for example, on the basis of a power output curve, e.g., a rotational speed/power output curve, of the wind power installation. The power output curve of the wind power installation can be calculated, for example, on the basis of a wind speed profile which is obtained for the forecast time period.

The adaptation rule which is assigned to the wind speed value preferably specifies a temperature-dependent power upper limit to which the ideal power output level is limited. The ideal power output level limited to the power upper limit then forms the expected power output level. The adaptation rule which is assigned to the wind speed value therefore stipulates the downward control amount or downward control portion by which the installation power output level of the wind power installation is to be reduced for this wind speed value.

The adaptation rule is assigned particularly chronologically to the expected power output level, specifically to the extent that this occurs together with the current expected power output level. In the specific calculation, the expected power output level calculated in the preceding step can be used for this as the current expected power output level. The adaptation rule can depend here in particular on the expected power output level and/or a temperature such as the outside temperature. It depends in particular on one or more component temperatures which can in turn depend on the expected power output level and the outside temperature.

By means of the adaptation rule it is possible to take into account in particular the respective component temperature of the at least one thermally relevant component. The ideal power output level, which is therefore determined by means of an idealized, that is to say simplified, power output level determination does not yet take into account thermal losses, at any rate not sufficiently. These are then taken into account by means of the adaptation rule, which leads, in particular, to a reduction in the ideal power output level and as a result yields the expected power output level. It is therefore assumed of the expected power output level that it actually corresponds better to the expected power output level than the ideal power output level.

The adaptation rule preferably specifies a temperature-dependent power upper limit to which the ideal power output level is limited, so that the ideal power output level which is limited to the power upper limit forms the expected power output level. There is particularly provision that this temperature-dependent power upper limit is specified in dependence on the at least one component temperature. As a result, the component temperatures, at least one component temperature, can be taken into account specifically. As a result, the individual thermally relevant components can be specifically taken into account.

An expected energy production loss which is thermally conditioned and is assigned to this wind speed value can be determined for the wind speed value from an ideal power output level or the ideal power output level and the expected power output level. For example, an ideal power output level and an expected power output level can each be multiplied by a specified time period, e.g., the time period of the forecast time period or the time period between two chronologically successive wind speed values, in order in this way to determine a theoretically possible energy production level from the ideal power output level and an expected energy production level from the expected power output level. The difference between the theoretically possible energy production level and the expected energy production level then corresponds to the energy production loss of the wind power installation within this time period.

In particular, the energy production loss for the wind speed value can also be calculated in that firstly the difference between the ideal power output level which is assigned to this wind speed value and the obtained expected power output level is formed. The difference can then be multiplied by a corresponding time period in order to determine the energy production loss within this time period. If a power output level determining step is respectively carried out for different wind speed values of the specified wind speed values by obtaining an expected power output level for the respective wind speed value from an ideal power output level by means of an adaptation rule which is assigned to the respective wind speed value, an energy production loss which is assigned to the respective wind speed value can be obtained for each of the wind speed values. The energy production losses which are obtained for the wind speed values can be summed or integrated in order to obtain an energy production loss for the entire forecast time period.

In particular, the component temperature of a thermally relevant component is obtained for one of the specified wind speed values during a power output level determining step, while the adaptation rule is obtained in a next, chronologically subsequent power output level determining step.

In this way, an adaptation rule which is obtained in a power output level determining step is respectively assigned to the chronologically subsequent wind speed value and used in the power output level determining step of the following wind speed value to determine an expected power output level by means of the adaptation rule, from an ideal power output level which is determined for the following wind speed value.

In order to determine the component temperature of the at least one thermally relevant component, a thermal capacity and/or at least one thermal resistance of the component is preferably taken into account. In particular, the component temperature of the at least one thermally relevant component is obtained in such a way that the component temperature of the at least one thermally relevant component is determined in dependence on the outside temperature and/or the thermal capacity.

The selection as to whether an installation component is a thermally relevant component or not is preferably carried out on the basis of a specified criterion.

It has been particularly recognized that the actual downward control behavior of the wind power installation by merely taking into account the outside temperature can lead to large inaccuracies.

The component temperature of a thermally relevant component is preferably modeled, that is to say simulated using a model. For this purpose, the model represents the transient thermal behavior of the component. A simulation can be carried out on the basis thereof in order to obtain the component temperature, in particular a chronological profile of the component temperature. In particular, the component temperature can be obtained individually for this thermally relevant component. The thermal capacity and the at least one thermal resistance can be input here into the model which was modeled.

In particular, if an installation component has been selected as a thermally relevant component, its component temperature can be obtained particularly reliably and accurately with a model, in particular a thermally transient model, of the component. Such a suitable model is, e.g., what is referred to as the lumped-element model, or else lumped thermal capacity (LTC) model. The LTC model can be applied particularly reliably if the Biot number of the component is equal to or less than 0.1. This is generally the case, in particular, for the stator, rotor and steel tower of a wind power installation. If this condition does not apply to an installation component, but it is nevertheless to be treated as a thermally relevant component, it is possible to adapt the LTC model correspondingly and to use it to model the component temperature of this component. With the LTC model it is possible to model the thermally transient behavior of a thermally relevant component. For the time steps which are used for the modeling it is possible to use, for example, time intervals of ten minutes. In particular, the time steps can be selected such that a wind speed value of a wind speed profile is predefined for each time step. Conversely, an expected power output level whose time stamp corresponds to one of the time steps for which a component temperature of a thermally relevant component is modeled can be determined from a wind speed profile for exactly those wind speed values in a power output level determining step.

The LTC model takes into account in particular the thermal resistance and the thermal capacity of an installation component. The outside temperature, the generated power output level and/or the power loss can also be taken into account in the LTC model.

A thermally relevant component can be selected, for example, according to the criterion that it can be assumed that the external resistance of the component is much larger than its internal thermal resistance. This can be described by the following formula:

$$\frac{T - T_\infty}{T_0 - T_\infty} = \exp\left(-\frac{hA}{mc}t\right)$$

where T is the component temperature at the time t, $T_0$ is the initial temperature at the time t=0, $T_\infty$ is the component temperature at the time t→∞, h is the height of the component and A is the cross-sectional area of the component, m is the mass of the component and c is the specific thermal capacity of the component.

Then, in particular the chronological temperature behavior should in fact not be neglected. It has been recognized that such a condition is satisfied particularly in the stator, the rotor (of the generator) and the steel tower. In the case of hybrid towers which are composed in certain sections of concrete and steel, the deviation can be larger and a model adaptation can be proposed. A component temperature of that installation component of the wind power installation which has not been selected as a thermally relevant component, for example a spinner, a machine housing or a water-cooled inverter in the tower is preferably not determined with a thermal transient model but rather with a steady-state model. Here, only steady states are taken into account because it has been recognized that the dynamic transition behavior is negligible. In the case of a steady-state model, in particular the outside temperature and the installation power output level are taken into account for obtaining a component temperature. In particular, the outside temperature is comparatively low, a component temperature of a thermally irrelevant component can be estimated on the basis of a derating curve of the wind power installation. The thermally irrelevant components can be selected, in particular, on the basis of the criterion that they react to a change in temperature essentially without a delay.

In the method, a temperature-dependent downward control rule can be respectively specified for the at least one thermally relevant component and in particular for each of the thermally relevant components. Each temperature-dependent downward control rule preferably respectively stipulates a rule for the downward control of the wind power installation, which rule is dependent on the component temperature of the respective thermally relevant component. An individual downward control rule is preferably specified for each thermally relevant component. A downward control rule which is assigned to a thermally relevant component can stipulate, for example, a maximum permissible temperature upper limit for a component temperature of this component. If a component temperature which has been obtained for the component exceeds this temperature upper limit, downward control of the wind power installation is to be carried out, specifically in particular to such an extent that the component temperature of the thermally relevant component drops again below the temperature upper limit, at least does not rise further. Preferably, a maximum permissible temperature upper limit is specified for each thermally relevant component of the wind power installation. However, it is also possible to provide respective multiple temperature limits for one or more components, which limits are assigned staggered downward control rules, e.g., in each case a percentage downward control value.

According to an embodiment it is proposed that at least one adaptation rule, which stipulates a rule for performing downward control of the wind power installation, is obtained in dependence on the at least one component temperature and optionally in dependence on a plurality of downward control rules.

Individual components are therefore assigned individual downward control rules which, can result in overall downward control of the wind power installation. Overall, the adaptation rule arises here which joins these individual downward control rules and then specifically gives rise to the expectation power output level which is reduced in comparison with the ideal power output level.

The adaptation rule therefore preferably stipulates the downward control amount or proportion by which downward control is to be carried out on the wind power installation—in particular starting from a determined ideal power output level, in order thereby to determine the expected power output level.

In order to determine the adaptation rule, for example a difference or a ratio can be formed between the maximum permissible temperature upper limit of a component and the component temperature which is obtained for this component. On the basis of the difference or the ratio it is then possible to obtain an adaptation rule, specifically in such a way that it stipulates whether at all, and if so by what amount, the installation power output level of the wind power installation is to be reduced so that the component temperature drops below the maximum permissible temperature upper limit.

It is preferably proposed that a plurality of power output level determining steps are executed in chronological succession, so that for a current power output level determining step there is a preceding power output level determining step. The wind speed values are gradually worked through here in their chronological sequence.

Furthermore, it is proposed that the adaptation rule, is obtained in the preceding power output level determining step or in dependence on a preceding power output level determining step and is used in a current power output level determining step to obtain an ideal power output level for a current wind speed value, and an expected power output level in dependence thereon and by means of the previously obtained adaptation rule.

The ideal power output level is therefore determined in the current power output level determining step. The adaptation rule which is obtained in the preceding step is used to convert the ideal power output level into the expected power output level. The calculation of the expected power output level is carried out in the current step, but the adaptation rule or corresponding information from the preceding step is used.

This means, of course, that in the current step an adaptation rule is obtained which is then used in the next step. It is appropriate for not just two steps but rather a multiplicity of steps to be carried out in a repetition loop, e.g., a step is carried out every ten minutes for a total time period of a year, that is to say approximately 50 000 steps.

The underlying concept here is particularly that one or more specific component temperatures are used for the adaptation rule. For this purpose, a dynamic temperature behavior of the respective thermally relevant component can be taken into account. Account is therefore taken of how the respective component temperature develops in the time interval under consideration. That is to say the time interval for which the power output level determining step, which is also referred to here in a simplifying fashion only as a step, is carried out. What is significant is preferably the component temperature at the end of the time interval, that is to say at the end of the step. The next power output level determining step then starts and this uses the component temperature obtained in this way as the component temperature, or a plurality of component temperatures from the previous power output level determining step. It is assumed here that the component temperature of this preceding step is still essentially current.

In a proposed method it is preferred that if it is ascertained that downward control of the wind power installation is to be carried out for a plurality of thermally relevant components on the basis of the adaptation rule which is assigned to the respective components, a downward control amount which brings about the greatest downward control of that thermally relevant component of the wind power installation is decisive. The determination of the expected power output level is therefore adapted particularly well to the actual behavior of the wind power installation so that a good level of accuracy of the expected power output level and therefore as a result of the expected energy production level can be achieved. It is in fact expected of the actual wind power installation for which the forecast is made that it behaves in such a way that it is ensured that the installation power output level is reduced to such an extent that none of the installation components is damaged.

The at least one thermally relevant component is preferably selected from a group of installation components which comprises at least a generator, in particular a stator and a rotor of a generator, and a tower, which is formed at least partially from steel. In particular the individual component temperatures of a stator, of a rotor and of a tower which is formed at least partially from steel can often be estimated only very inaccurately on the basis of conventional methods such as, e.g., on the basis of a derating curve. It has been particularly recognized that the thermal behavior of these components cannot be assumed to be steady state or it gives rise to an excessive deviation from the actual behavior. For this purpose, the rotor and the stator of the generator can be considered individually or together.

It has been recognized that by modeling the component temperature of these components by means of a thermally transient model, such as the LTC model, individually and while taking into account at least the thermal capacity of the respective component an expected power output level can be determined using the modeled component temperatures with a comparatively high level of reliability and accuracy and, in particular, more realistically.

The method is also suitable for accessing or determining the necessity and dimensioning for a cooling system for an installation component.

According to one embodiment it is proposed that at least one thermally relevant component is provided with an active cooling system, and in order to determine the component temperature of the respective thermally relevant component, a behavior of the active cooling system is taken into account, wherein there is in particular provision that the method for determining the expected energy production is carried out at least once as a method with active cooling and once as a method without active cooling, wherein the active cooling system is taken into account in the execution as a method with cooling, and the active cooling system is not taken into account in the execution as a method without cooling, and in particular a comparison of the respectively obtained expected energy production is made.

As a result, the necessity and possible dimensioning for a cooling system can be assessed. This is based on the realization that a cooling system can be incorrectly assessed as a result of inaccurate determination of the expected energy production level. The improved forecast improves this. In this respect is has been recognized that the effects of such a cooling system on the energy production level can now be detected accurately in such a way that determination of the energy production level with a cooling system and determination without a cooling system can respectively lead to sufficiently reliable values.

In particular there is provision that the respectively obtained energy production levels which are to be expected are then compared. On the basis of the comparison it can be detected whether the use of the active cooling system is actually advantageous and/or whether the active cooling system is already dimensioned in a way which is optimized in respect of energy.

BRIEF DESCRIPTION OF THE SEVERAL VIEWS OF THE DRAWINGS

The invention will now be explained in more detail on the basis of preferred exemplary embodiments and with reference to the figures, of which.

DETAILED DESCRIPTION

Figure 1:
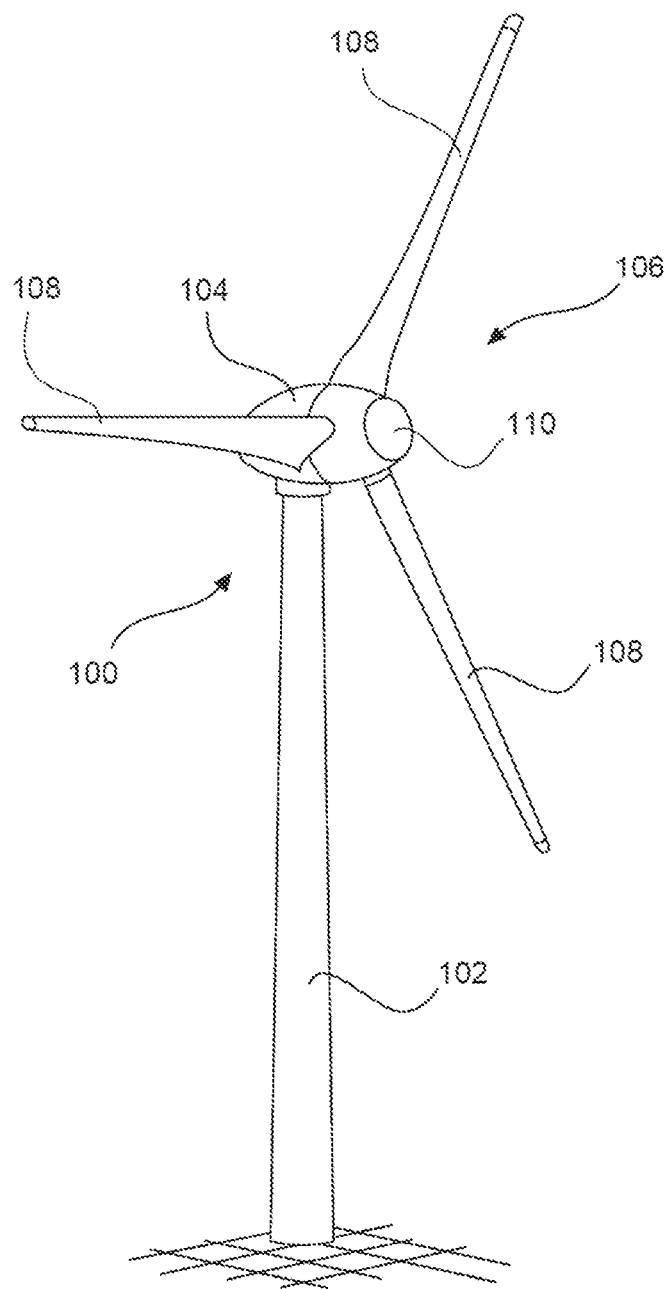
FIG. 1: shows a wind power installation which has a plurality of installation components.

FIG. 1 shows a schematic view of a wind power installation 100 according to one embodiment.

The wind power installation 100 has for this purpose a tower 102 and a nacelle 104. An aerodynamic rotor 106 with three rotor blades 108 and a spinner 110 is arranged on the nacelle 104. The rotor 106 is made to move in rotation by the wind during operation and as a result drives a generator in the nacelle 104.

The generator is connected to an electrical power grid, for example a wind farm power grid or an electrical supply power grid, by means of an inverter, in order to feed in a three-phase oscillating current.

The wind power installation comprises for this a control circuit and/or a controller and/or an inverter and/or a controller of an inverter which is configured to execute a method as described above or below.

Figure 2:
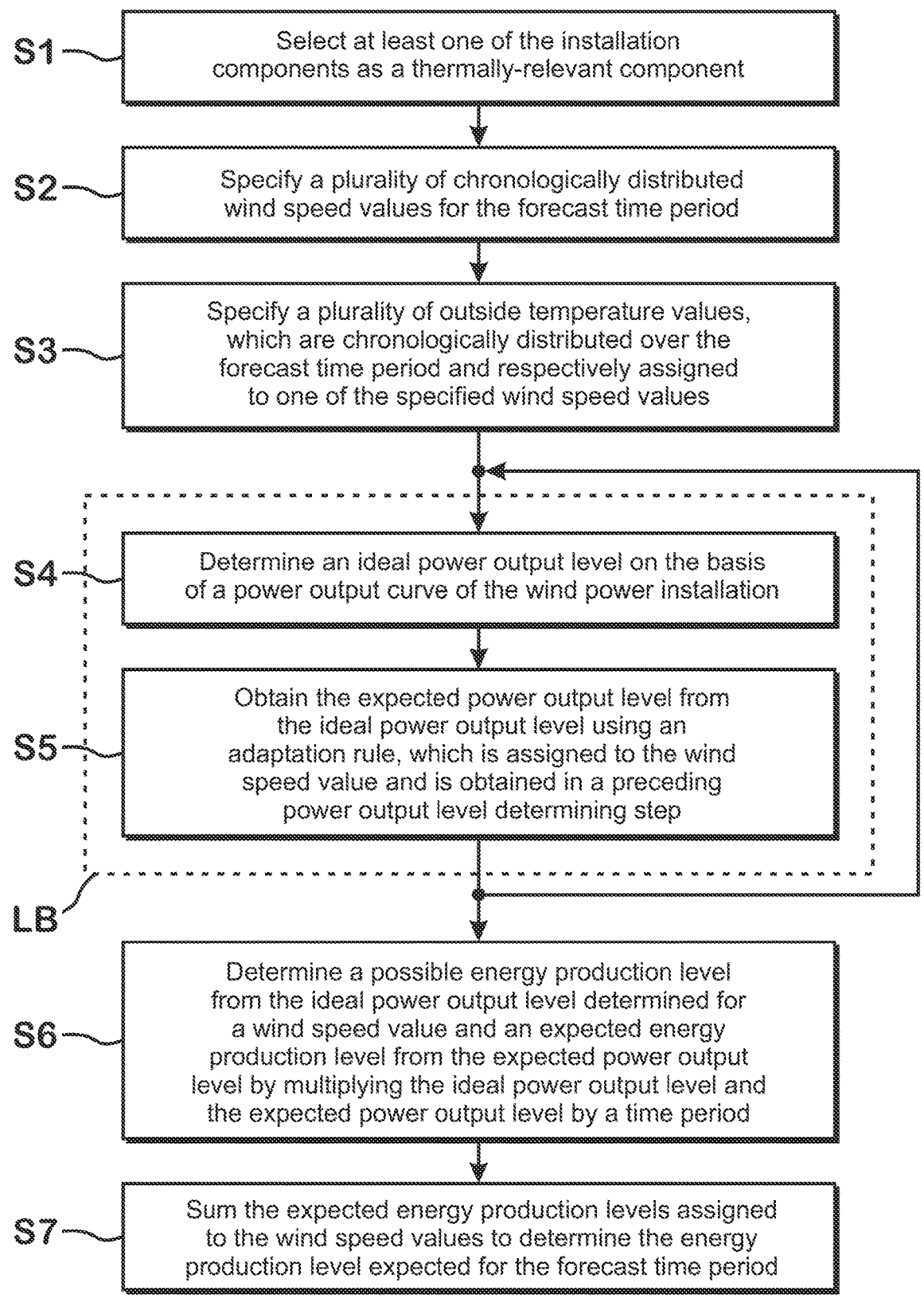
FIG. 2: shows a flow diagram of a method for determining the expected energy production level.

FIG. 2 shows a flow diagram of a method for determining the expected energy production level of a wind power installation within a forecast time period. The wind power installation has a plurality of installation components. At least one of the installation components is selected as a thermally relevant component (step S1) according to a predefined criterion, in particular in dependence on the ratio of the external thermal resistance of an installation component to its internal thermal resistance. In the method a plurality of chronologically distributed wind speed values are also specified for the forecast time period (step S2). The specified wind speed values can be wind speed values of a wind speed profile. In the method, a plurality of outside temperature values which are chronologically distributed over the forecast time period and are respectively assigned to one of the specified wind speed values are also specified (step S3). However, in alternative variants of the method no outside temperature values are specified and are therefore not taken into account in obtaining an expected power output level for a wind speed value.

In the method, in order to determine the expected energy production level over the forecast time period, a power output level determining step LB is respectively carried out successively for all the specified wind speed values. Each of the power output level determining steps LB can be carried out as described with respect to FIG. 3.

In particular, in each of the power output level determining steps LB an expected power output level, assigned to one of the specified wind speed values, of the wind power installation is determined for this wind speed value. In order to determine the expected power output level for one of the wind speed values, an ideal power output level is firstly determined on the basis of a power output curve of the wind power installation (step S4). The expected power output level is obtained from the ideal power output level by means of an adaptation rule which is assigned to the wind speed value and has been obtained in one of the preceding power output level determining steps (step S5). The adaptation rule stipulates in particular the downward control amount or downward control proportion of the installation power output level of the wind power installation by which a reduction will be implemented in the next step or pass. In particular, the adaptation rule specifies a temperature-dependent power upper limit to which the ideal power output level is to be limited, so that the ideal power output level which is limited to the power upper limit forms the expected power output level provided that the ideal power output level is not already below it.

The adaptation rule is obtained in particular in dependence on the component temperature of at least one thermally relevant component. In particular, in a power output level determining step for a wind speed value a component temperature of at least one thermally relevant component is obtained individually for this component. The adaptation rule is then obtained by means of a downward control rule which is specified for this thermally relevant component, and by means of the determined component temperature, and assigned to a chronologically subsequent wind speed value. The adaptation rule then stipulates the downward control amount or downward control proportion by which the ideal power output level determined for the subsequent wind speed value is to be reduced. For example, the downward control rule can specify a maximum permissible temperature upper limit for a component. If the component temperature which is obtained for this component is above the temperature upper limit, the adaptation rule in particular is obtained in such a way that the installation power output level is reduced by a downward control amount which is selected in such a way that the component temperature drops below the temperature upper limit again.

In the method, the component temperature of at least one thermally relevant component is obtained in dependence on the thermal capacity of the components by means of a thermally transient model. By using a thermally transient model of the component, the component temperature can be determined in particular in dependence on the intrinsic properties such as the geometry and the thermal capacity of the component. Comparatively inaccurate estimation of the component temperature on the basis of an outside temperature value can be avoided in this way.

However, in order to determine the expected power output level for a wind speed value it is possible to use, in addition to the component temperatures which are assigned to this wind speed value, also the outside temperature value which is assigned to this wind speed value, in order to make the calculation of the component temperatures even closer to reality.

A theoretically possible energy production level is calculated from the ideal power output level determined in a power output level determining step LB for a wind speed value, and an expected energy production level is calculated from the expected power output level determined in this power output level determining step LB, by multiplying the ideal power output level and the expected power output level by a time period (step S6). The respective time period is respectively selected for each of the wind speed values in such a way that it encompasses the time period up to the chronologically subsequent wind speed value. In this way, each of the specified wind speed values and expected energy production levels which is assigned to this wind speed value is respectively calculated.

In order to determine the energy production level which is expected for the forecast time period, the expected energy production levels which are assigned to the wind speed values are summed (step S7).

Alternatively or additionally, an energy production loss which is expected for the forecast time period can also be determined by obtaining a theoretically possible energy production level and an expected energy production level for each of the wind speed values and forming the difference between them. The difference then corresponds to the energy production loss for this wind speed value. A respectively assigned expected energy production loss can therefore be determined for each of the wind speed values, and the plurality of energy production losses which are determined in this way can be summed, in order therefore to calculate the energy production loss which is expected for the forecast time period.

Figure 3:
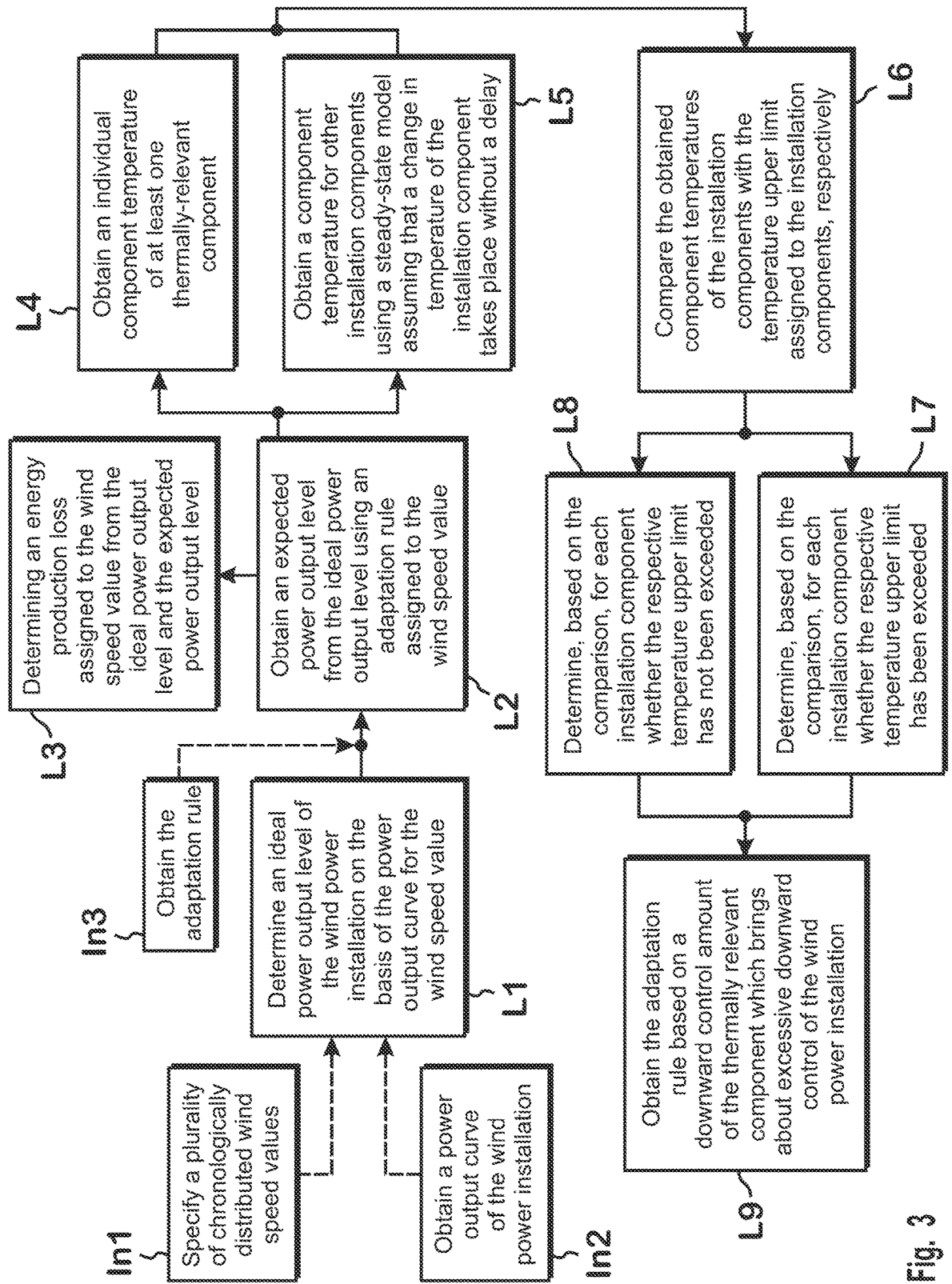
FIG. 3: shows a flow diagram of a power output level determining step.

FIG. 3 shows a flow diagram of a power output level determining step in which an expected power output level of a wind power installation with a plurality of installation components is obtained for a wind speed value, and an adaptation rule which is assigned to a chronologically subsequent wind speed value is obtained.

Before the power output level determining step is executed, a plurality of chronologically distributed wind speed values are specified (step In1) and a power output curve of the wind power installation is obtained (step In2). The time stamps of the specified wind speed values are in particular within a forecast time period for which an expected energy production level of a wind power installation is to be determined.

The specified wind speed values can be wind speed values of a wind speed profile. The same wind speed profile can be used to obtain the power output curve of the wind power installation.

The power output level determining step for one of these specified wind speed values is executed, but can be repeated successively for all the further specified wind speed values.

In the power output level determining step, an ideal power output level of the wind power installation is firstly obtained on the basis of the power output curve for the wind speed value (step L1). An expected power output level is obtained from the ideal power output level by means of an adaptation rule which is assigned to the wind speed value (step L2). The adaptation rule has been obtained chronologically before the power output level determining step (step In3) and assigned to this wind speed value. The adaptation rule specifies a temperature-dependent power upper limit to which the ideal power output level is reduced. The reduced installation power output level is then the expected power output level. In particular, the adaptation rule which is assigned to the wind speed value has been obtained in a preceding power output level determining step which was executed for a chronologically earlier wind speed value. In particular, in the preceding power output level determining step a component temperature of at least one thermally relevant component was modeled and compared with a temperature upper limit specified for the component, and the adaptation rule assigned to the wind speed value was obtained on the basis of the comparison.

If the power output level determining step is executed as the first power output level determining step and there is correspondingly no preceding power output level determining step, the adaptation rule can be specified with the value 1, so that for this power output level determining step the ideal power output level corresponds to the expected power output level. Alternatively, a value can be assumed on the basis of a steady-state behavior. It is also taken into consideration that the first step, or a plurality of first steps, is/are not included in the actual determination of the expected energy production level and do not serve only for the transient oscillation of the process.

The expected power output level can be converted into an energy production level which is expected for a specific time period by multiplying said energy production level by a time period. The time period can correspond in particular to the time interval between this wind speed value and a chronologically successive wind speed value of the specified wind speed values. In particular, an energy production level can be respectively obtained for all the specified wind speed values, for the time period up to the wind speed value which is the one which follows next in chronological terms and the obtained energy production levels are summed in order to determine the expected energy production level for a forecast time period. However, it is also possible to assume a time profile of the expected power output levels, and to only integrate later this profile over the forecast time period to form the expected energy production level.

An energy production loss which is assigned to the wind speed value can also be calculated from the ideal power output level and the expected power output level (step L3) by forming the difference between the ideal power output level and the expected power output level and multiplying it by a specified time period. The ideal power output level and expected power output level can also be firstly converted into energy levels and then the difference is formed in order to determine the energy production loss which is assigned to the wind speed value. If an energy production loss is respectively determined for a plurality of wind speed values this plurality of energy production losses can be summed or integrated in order to determine an expected energy production loss for the forecast time period.

Then, an adaptation rule for a chronologically subsequent wind speed value is obtained in the power output level determining step. In order to obtain the adaptation rule, the installation components of the wind power installation are firstly considered.

A thermally relevant component is selected from the installation components on the basis of a specified criterion. The criterion can be specified in such a way that installation components whose internal thermal resistance is negligible in comparison with their external resistance are thermally relevant components.

For the at least one thermally relevant component, an individual component temperature of the component is obtained by means of a thermally transient model, in particular by means of the LTC model and taking into account the thermal capacity of the component (step L4). For the other installation components, a component temperature is obtained by means of a steady-state model on the assumption that a change in temperature of the installation component takes place without a delay (step L5).

An adaptation rule for a chronologically subsequent wind speed value is obtained for each of the installation components in dependence on the respectively obtained component temperatures and downward control rules which are respectively assigned to the installation components.

The downward control rules of the installation components respectively specify a maximum permissible temperature upper limit for their assigned installation component. The obtained component temperatures of the installation components are respectively compared with the temperature upper limit assigned to the respective installation component (step L6).

On the basis of the respective comparisons it is determined for each installation component whether the respective temperature upper limit has been exceeded (step L7) or not (step L8). If the component temperatures of a plurality of installation components have exceeded the associated temperature upper limit the downward control amount or downward control proportion by which the wind power installation has to be downward controlled is also detected so that the component temperatures are below their temperature upper limit again.

In particular the downward control amount of that thermally relevant component which brings about excessive downward control of the wind power installation is then decisive for obtaining the adaptation rule (step L9).

Figure 4:
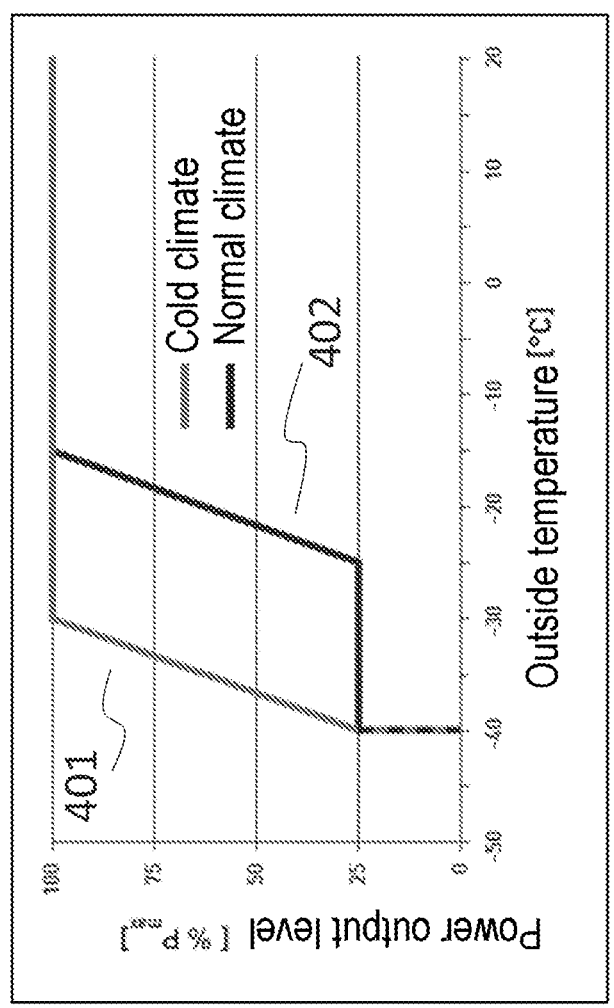
FIG. 4: shows two derating curves of a wind power installation with a cooling package option.

FIG. 4 shows two derating curves of a wind power installation, respectively with an option for a cold climate (cold climate) and without such an option (normal climate): a first derating curve 401 is for a cold climate, and a second derating curve 402 is for a normal climate.

The derating curves 401, 402 respectively describe the maximum permissible installation power output level of the wind power installation in dependence on the outside temperature.

Significant differences can be discerned between the two derating curves 401, 402 in particular in the temperature range between −40° C. and −20° C. These different derating curves 401, 402 can be taken into account in the determination of the expected power output level.

Figure 5:
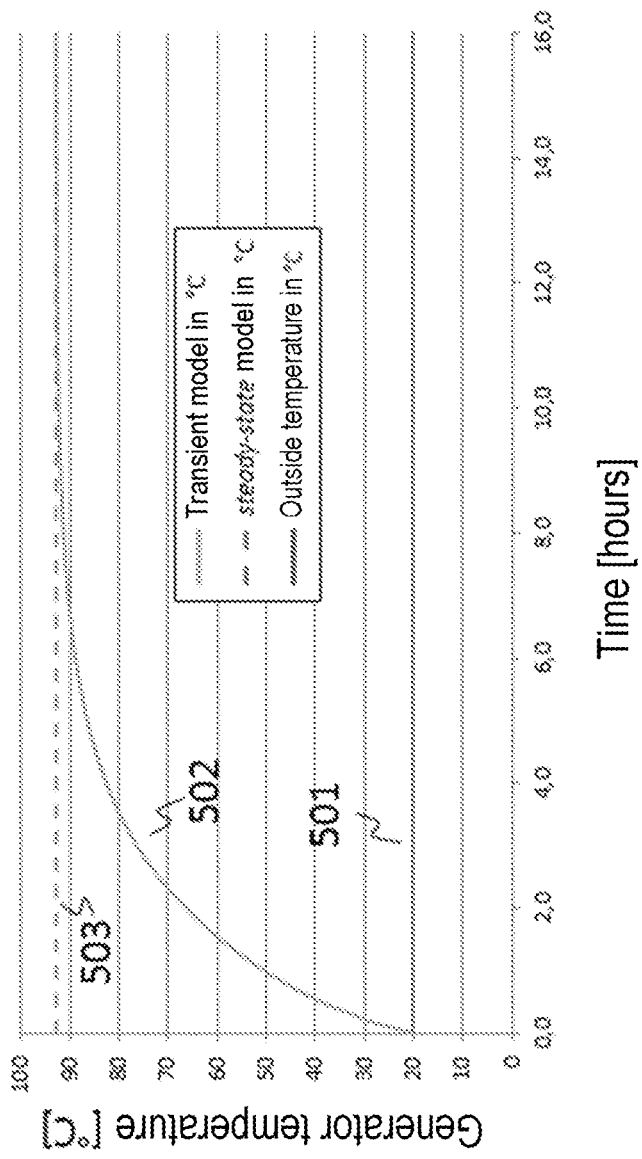
FIG. 5: shows a component temperature profile of a generator.

FIG. 5 shows a component temperature profile of a generator, calculated once with a thermally transient model and calculated once with a steady-state model. A constant outside temperature of 20° C. has been assumed for both simulations, and this is illustrated by the first curve 501.

The component temperature of the generator, simulated with the steady-state model, is constant at one value over the entire duration of the simulation. This profile is shown by the third curve 503.

The component temperature profile of the generator, which is simulated with the thermally transient model, exhibits a dynamic behavior. The profile is represented by the second curve 502. At the start of the simulation, the component temperature of the generator rises continuously starting from the value of the outside temperature. As the simulated time period continues, the component temperature of the generator approaches the value of the component temperature which is calculated with the steady-state model. Starting from a simulated time period of approximately ten hours, both models essentially supply the same result for the component temperature of the generator.

In particular, during the simulated time period of the first ten hours the component temperature of the generator is overestimated as a result of the use of the steady-state model. It has been recognized here that the chronologically thermal behavior of the generator can also be quite significant—as can be recognized from the large time constant according to FIG. 5—and can also be for other components.

Figure 6:
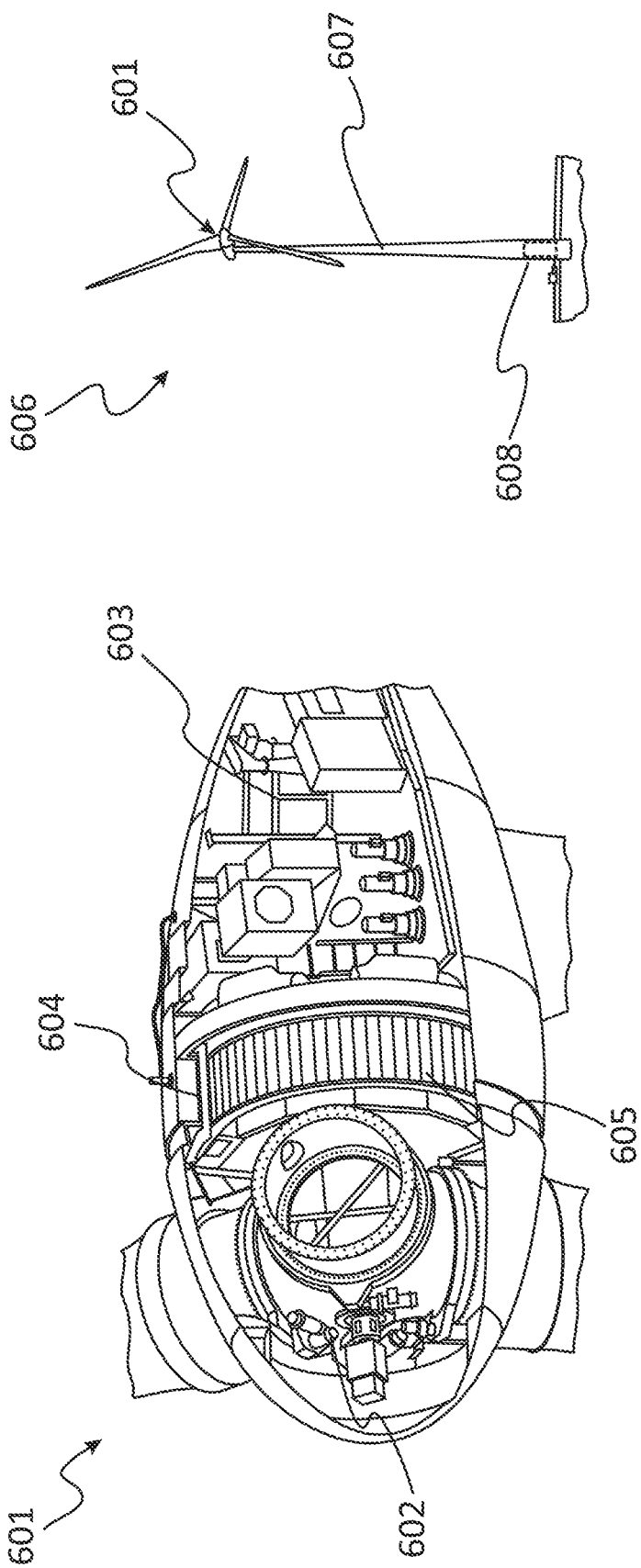
FIG. 6: shows a schematic view of a wind power installation and of a cut-open nacelle.

FIG. 6 illustrates installation components which are relevant for a thermal consideration, specifically in one detail of a partially cut-away nacelle 601, a spinner 602 which forms the part of the nacelle 601 facing the wind, and a machine housing 603 which forms the part of the nacelle facing away from the wind. These two components can be taken into account by means of a steady-state model. Furthermore, a stator 604 and a rotor 605, which together essentially form a generator, are shown. The stator 604 and rotor 605 or the generator each have a thermal behavior for which it is proposed that it should be respectively taken into account by means of a dynamic model, in particular an LTC model.

FIG. 6 also shows schematically a wind power installation 606 which has the nacelle 601 which is arranged on a tower 607, but in a non-sectional illustration. In the tower 607 there is an electric module 608, also in particular an inverter device which usually has a large number of inverters. The electric module 608 is illustrated on the outside only for the purpose of illustration. However, it is usually arranged in the tower, specifically at the tower base there and its thermal behavior can depend on the tower 607 and the method of cooling the electric module.

Figure 7:
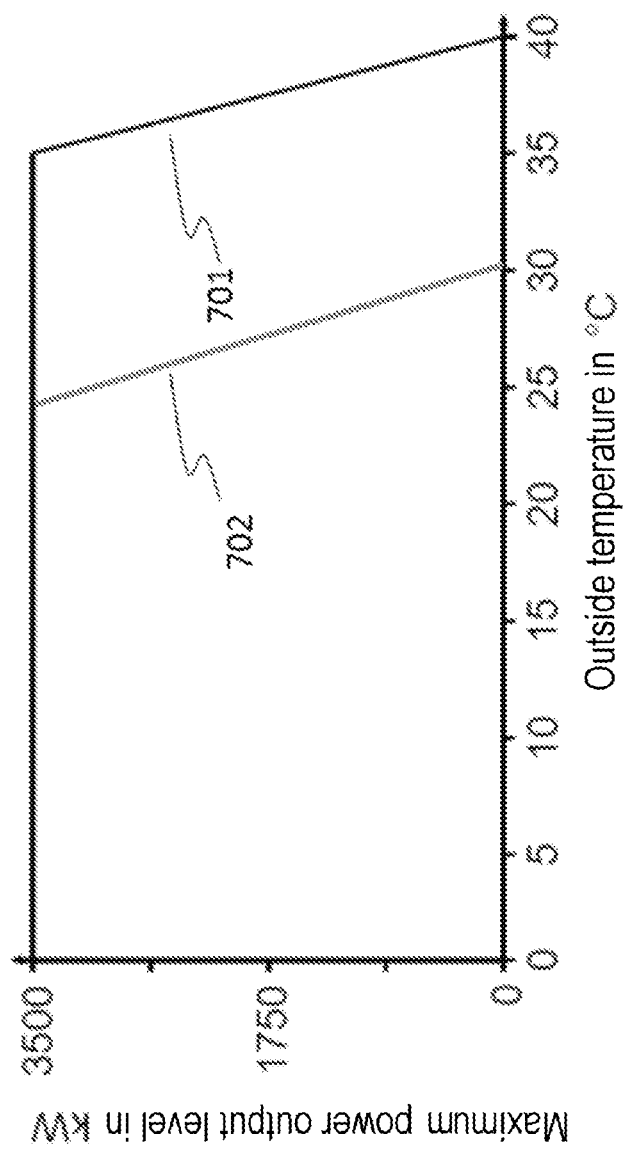
FIG. 7: shows a derating curve of a wind power installation with an option for a warm climate.

FIG. 7 shows a derating curve 701 of a wind power installation with an option for a hot climate (hot climate). A derating curve of a wind power installation without such an option, the derating curve 702, already exhibits a power reduction at a relatively low temperature.

The derating curves of FIG. 7 show how such different cooling options have previously been taken into account in predictions for their determination of expected power output levels. However, it has been recognized that an option for a hot climate (hot climate) can have a different cooling concept.

Air cooling, which brings about heating of the air in the tower, is frequently used particularly for the electric module, that is to say particularly for the inverters which are arranged in the tower base. According to a normal option, the tower wall is used for re-cooling the air which has been heated in this way. For this purpose, the air rises in the interior of the tower and cools on the tower wall. Contact with outside air, which may be contaminated, is avoided. It has been recognized that the thermal dynamics of the tower can play a role here and they are therefore taken into account in the determination of the expected energy production level.

In the option for a hot climate (hot climate) it is assumed that the cooling effect by means of the tower wall is not sufficient because the tower does not cool down sufficiently and instead the heated air is replaced with cooler outside air. The tower wall is therefore not used, or not used exclusively, for cooling. Here, the thermal dynamics of the tower wall can therefore be ignored. This option can also be referred to as an active cooling system, whereas the cooling by means of the tower wall can be referred to as a passive cooling system. In order to check which of the two options provides a better yield, the method for determining an expected energy production level can be made independent for the two options and the results can be compared.

In another cooling concept, in particular for the electric module, that is to say particularly for the inverters which are arranged in the tower base, a water cooling system with a heat exchanger located outside the tower can be provided. This can be provided for both options, that is to say both for the option for a hot climate (hot climate) as well as for the normal option, wherein the options can then differ in their configuration, that is to say in particular in respect of the magnitude of the cooling flow and the size of the heat exchanger. This cooling concept can also be referred to as an active cooling system, and the thermal dynamics can also be ignored here.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for estimating an annual energy production expected from a wind power installation for an annual forecast time period, the method comprising:
   selecting at least one component of a plurality of components of the wind power installation as a thermally-relevant component;
   arranging a plurality of wind speed values for the forecast time period in a chronological order;
   determining an expected power output level of the wind power installation for a first wind speed value of the plurality of wind speed values, wherein the determining is in dependence on a component temperature of the thermally-relevant component, the expected power output level being an installation power output level expected to be generated by the wind power installation for the first wind speed value;
   estimating the annual energy production of the wind power installation expected for the forecast time period based on the expected power output level of the wind power installation determined for the first wind speed value;
   repeating determining the expected power output level successively for remaining wind speed values of the plurality of wind speed values to obtain a plurality of expected power output levels;
   obtaining the component temperature of the thermally-relevant component respectively assigned to a corresponding wind speed value of the plurality of wind speed values and determining a respective expected power output level based on the component temperature respectively assigned to the corresponding wind speed value; and
   estimating the annual energy production of the wind power installation expected for the forecast time period based on the plurality of expected power output levels.

2. The method as claimed in claim 1, comprising:
   determining, for the first wind speed value, a power output level that the wind power installation is capable of generating under boundary conditions that do not account for thermal losses.

3. The method as claimed in claim 2, comprising determining the expected power output level from the power output level that the wind power installation is capable of under boundary conditions that do not account for thermal losses, wherein determining includes specifying a temperature-dependent power upper limit that limits the power output level such that the power output level as limited to the temperature-dependent power upper limit forms the expected power output level.

4. The method as claimed in claim 1, comprising:
   determining an expected energy production loss assigned to the first wind speed value for at least one of a power output level that the wind power installation is capable of generating under boundary conditions that do not account for thermal losses, and the expected power output level.

5. The method as claimed in claim 1, comprising:
   determining the component temperature of the thermally-relevant component based on a thermal capacity and/or at least a thermal resistance of the thermally-relevant component.

6. The method as claimed in claim 5, comprising:
   determining the component temperature of the thermally-relevant component based on an ambient temperature and/or the thermal capacity.

7. The method as claimed in claim 1, comprising:
   specifying a plurality of temperature-dependent throttling rules for a plurality of thermally-relevant components of the wind power installation, respectively, wherein each temperature-dependent throttling rule of plurality of temperature-dependent throttling rules respectively represents a rule for performing throttling of the wind power installation that is dependent on the component temperature of the respective thermally-relevant component.

8. The method as claimed in claim 1, comprising:
   obtaining at least one adaptation rule specifying a throttling of the wind power installation, wherein the at least one adaptation rule specifies a temperature-dependent power upper limit that limits the power output level such that the power output level as limited to the temperature-dependent power upper limit forms the expected power output level.

9. The method as claimed in claim 8, comprising:
   obtaining the at least one adaptation rule based on the component temperature or based on a plurality of throttling rules.

10. The method as claimed in claim 1, comprising:
    determining a plurality of expected power output levels for the plurality of wind speed values, wherein the determining is in dependence on a component temperature of the thermally-relevant component and a preceding expected power output level of the plurality of expected power output levels.

11. The method as claimed in claim 1, comprising:
    determining that a plurality of thermally-relevant components are to be throttled; and
    selecting a maximum throttling for the thermally-relevant component.

12. The method as claimed in claim 1, wherein the thermally-relevant component is selected from a group of installation components which include at least: a generator, a stator of the generator, a rotor of the generator, and a tower formed at least partially from steel.

13. The method as claimed in claim 1, wherein:
    the thermally-relevant component is associated with an active cooling system, and
    the method comprises:
        determining the component temperature of the thermally-relevant component based on a behavior of the active cooling system.

14. A method for estimating energy production expected from a wind power installation for a forecast time period, the method comprising:
    selecting at least one component of a plurality of components of the wind power installation as a thermally-relevant component;
    arranging a plurality of wind speed values for the forecast time period in a chronological order;

determining an expected power output level of the wind power installation for a first wind speed value of the plurality of wind speed values, wherein the determining is in dependence on a component temperature of the thermally-relevant component, the expected power output level being an installation power output level expected to be generated by the wind power installation for the first wind speed value;

estimating the energy production of the wind power installation expected for the forecast time period based on the expected power output level of the wind power installation determined for the first wind speed value, wherein the thermally-relevant component is associated with an active cooling system;

determining the component temperature of the thermally-relevant component based on a behavior of the active cooling system; and estimating the energy production expected for the forecast time period at least once for performing active cooling and at least once without performing active cooling, wherein:

the active cooling system is taken into account in determining the energy production expected for the forecast time period when active cooling is performed; and the active cooling system is not taken into account in determining the energy production expected for the forecast time period when active cooling is not performed.

15. The method as claimed in claim 14, comprising:

comparing the energy production expected for the forecast time period determined for active cooling and the energy production expected for the forecast time period determined without active cooling.

16. A method for estimating energy production expected from a wind power installation for a forecast time period, the method comprising:

selecting at least one component of a plurality of components of the wind power installation as a thermally-relevant component;

arranging a plurality of wind speed values for the forecast time period in a chronological order;

determining an expected power output level of the wind power installation for a first wind speed value of the plurality of wind speed values, wherein the determining is in dependence on a component temperature of the thermally-relevant component, the expected power output level being an installation power output level expected to be generated by the wind power installation for the first wind speed value;

estimating the energy production of the wind power installation expected for the forecast time period based on the expected power output level of the wind power installation determined for the first wind speed value;

arranging a plurality ambient temperature values each respectively assigned to the plurality of wind speed values in a chronological order; and determining the expected power output level for the first wind speed value using an ambient temperature value of the plurality of ambient temperature values assigned to the first wind speed value and the component temperature of the thermally-relevant component assigned to the first wind speed value.

* * * * *